COOLMAN & YOUNG.
Harvester Gearing.

No. 89,973.

Patented May 11, 1869.

UNITED STATES PATENT OFFICE.

GRANT T. COOLMAN AND CHARLES M. YOUNG, OF CORRY, PENNSYLVANIA.

IMPROVEMENT IN HARVESTERS.

Specification forming part of Letters Patent No. 89,973, dated May 11, 1869.

*To all whom it may concern:*

Be it known that we, GRANT T. COOLMAN and CHARLES M. YOUNG, both of Corry, in the county of Erie and State of Pennsylvania, have invented a new and useful Improvement in Clutch-Couplings for the Driving-Shafts of Harvesters, of which the following is a full, clear, and exact description, reference being had to the accompanying drawings, which make part of this specification, and in which—

Figure 1:
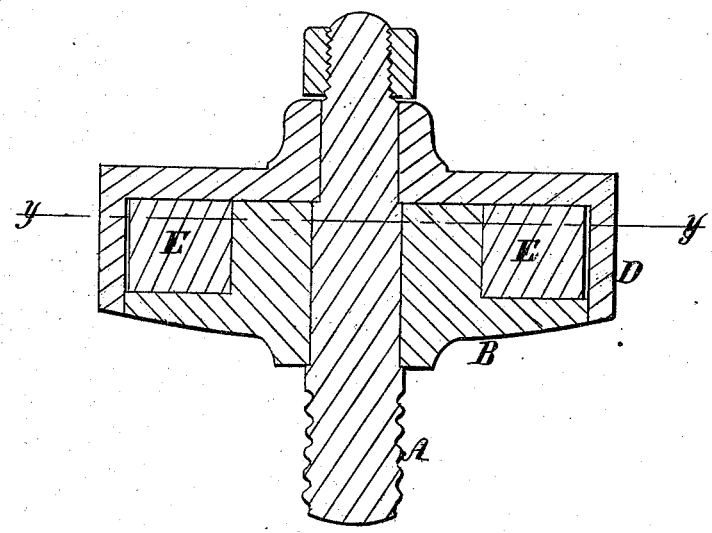
Figure 2:
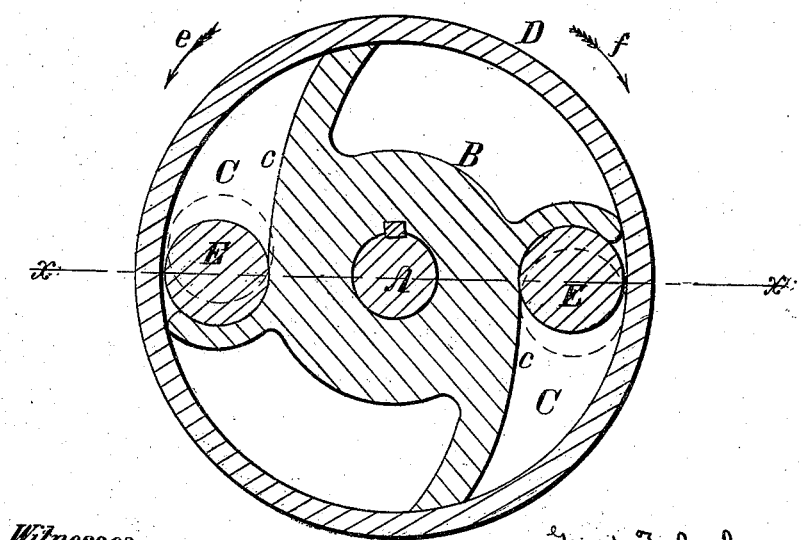

Figure 1 represents a horizontal section through our improved clutch at the line $xx$ of Fig. 2. Fig. 2 is a vertical section at the line $yy$ of Fig. 1.

The object of our invention is so to combine the driving-wheels of a harvester with their axles that they may be automatically, instantaneously, and firmly locked upon and turned with the axle when moving forward, and yet be quickly automatically released, so as to revolve loosely on the axle when the machine is backed, while dispensing with springs, pawls, and ratchets; to which end the improvement herein claimed consists in a novel method, hereinafter described, of combining a driving-wheel turning loosely on its axle with a collar fast on the axle, inclosed within the hub of the driving-wheel, and containing chambers having floors tangential to the axle to receive rollers moving freely in the chambers, which rollers roll forward by gravity alone when the machine advances and lock the wheel to the axle, and release it in a similar manner when the wheel is backed.

In the accompanying drawings, a collar, B, is shown as keyed fast upon the axle A. Chambers C in this collar have their floors $c$ tangential to the axle A. The collar B is inserted in and inclosed by the hub D of the wheel, which revolves loosely on the axle A. Rollers E are inclosed in the chambers C, being smaller in diameter than the greatest depth of the chambers, but greater in diameter than the smaller part of the chambers. These rollers lie loosely in the chambers when the wheel moves backward in the direction indicated by the arrow $e$, as the friction of the hub, as well as their own gravity, then tends to retain them in that part of the chamber, and thus permits the wheel to turn without the axle. When, however, the machine advances and the wheel turns forward, as shown by the arrow $f$, the gravity of the rollers and the friction of the hub cause the rollers to move forward into the position shown in red in Fig. 2 and lock the collar and hub together, thus causing the wheel to revolve with the axle and drive the gearing and other mechanism.

The advantages of our invention are, that we secure a positive automatic connection and disconnection of the wheel and axle without the use of springs or ratchets, each one of the rollers counterbalances the strain of the opposite one on the hubs, and the whole mechanism is incased within the hub of the driving-wheel.

We are aware that an eccentric plate revolving with a driving-wheel, and provided with a spring to hold a roller in contact with a disk fixed on the driving-axle, has been used, and therefore disclaim that construction.

What we claim as our invention, and desire to secure by Letters Patent, is—

1. The combination of the chambered collar fixed on the axle, the driving-wheel hub inclosing the collar, and the loose jamming-rollers, the whole constructed as set forth for joint operation.

2. Also, the collar B, keyed fast on the axle, and constructed as described, with recessed chambers having sides curved tangentially to the axle, as set forth.

In testimony whereof we have hereunto subscribed our names.

GRANT T. COOLMAN.
CHARLES M. YOUNG.

Witnesses:
J. S. FISK,
JOHN DICK, Jr.